E. ROTHLISBERGER.
RELIEF VALVE.
APPLICATION FILED AUG. 22, 1910.
989,809.
Patented Apr. 18, 1911.
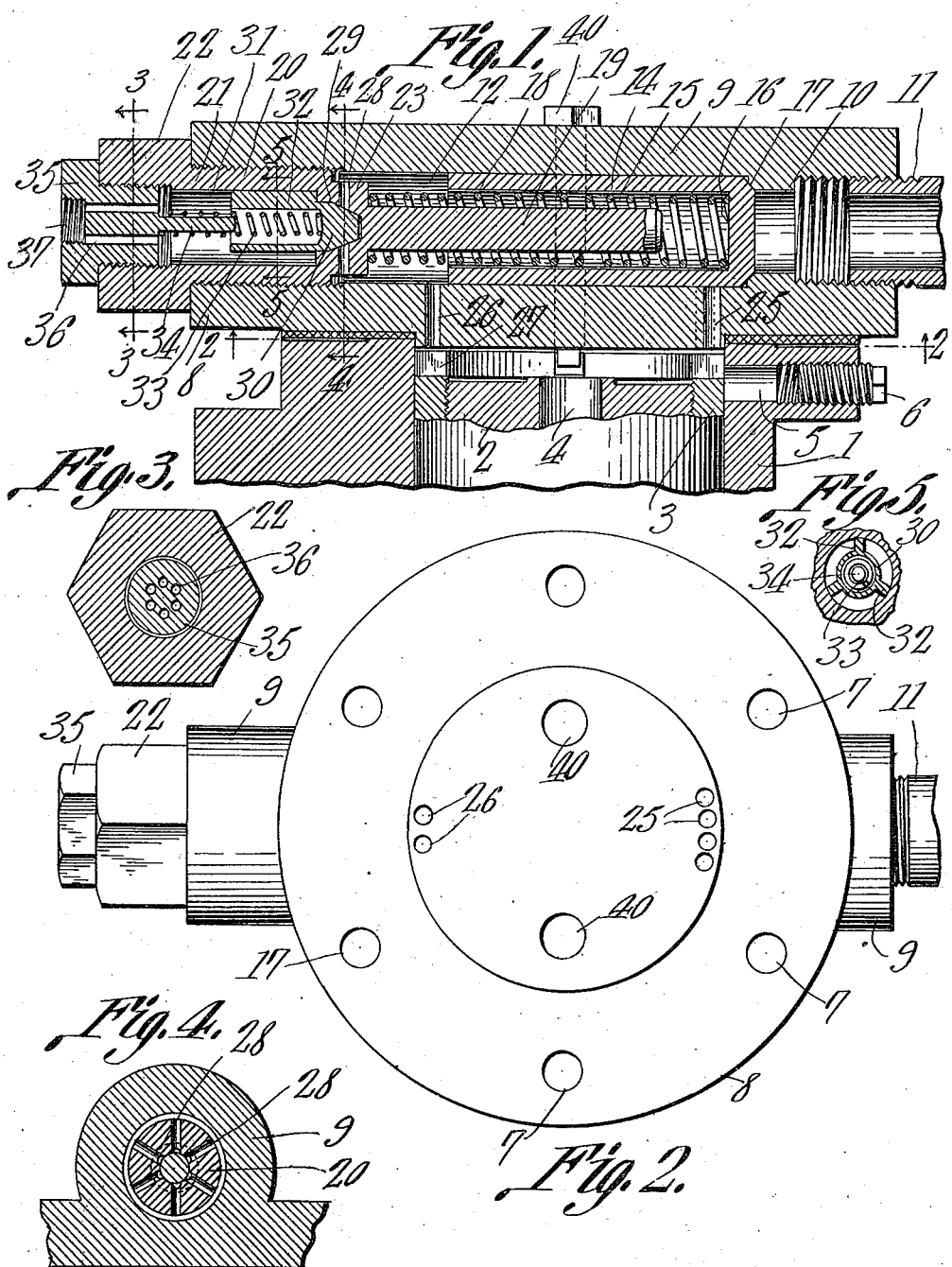

UNITED STATES PATENT OFFICE.

ERNESTE ROTHLISBERGER, OF PORTSMOUTH, VIRGINIA, ASSIGNOR OF ONE-TENTH TO L. W. W. BROCKENBROUGH AND THREE-TENTHS TO STANLEY SCOTT, BOTH OF NORFOLK, VIRGINIA.

RELIEF-VALVE.

989,809.     Specification of Letters Patent.     Patented Apr. 18, 1911.

Application filed August 22, 1910. Serial No. 578,350.

*To all whom it may concern:*

Be it known that I, ERNESTE ROTHLISBERGER, a citizen of the United States, residing at Portsmouth, in the county of Norfolk and State of Virginia, have invented a new and useful Relief-Valve, of which the following is a specification.

This invention relates to relief valve attachments for fluid operated devices such for example as air brakes, wherein a piston member or other fluid operated part is utilized for applying the brakes or performing some other equivalent function.

In air brakes and the like, when the fluid pressure is exhausted from the piston cylinder or other operating member, so as to permit the springs or other reacting devices on the opposite side of the piston to throw it back to initial position, it is found in practice that the piston recoils with considerable jar and consequent wear on the piston cylinder.

The principal object of the present invention is to provide improved means for supplying fluid pressure to the operating face of the brake piston or other device, and for causing said piston to become seated gently and properly when the fluid pressure is exhausted.

Further objects of the invention are generally to improve and simplify the construction of relief valves, as well as to increase their efficiency in operation and to decrease the expense attending their manufacture, installation and repair.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claims without departing from the spirit of the invention.

In the accompanying drawings forming part of this specification:—Figure 1 is a longitudinal section through a portion of one end of a valve cylinder, showing the relief valve of the present invention secured thereto, the valve casing and parts being shown in section. Fig. 2 is an under plan view of the relief valve and the base plate thereof, which serves as a cylinder head for the piston cylinder. Figs. 3, 4, and 5 are sections on the lines 3—3, 4—4, and 5—5 respectively of Fig. 1.

Like reference numerals indicate corresponding parts in the different figures of the drawing.

The reference numeral 1 indicates a portion of the end of a piston cylinder in which is mounted a piston 2 having a removable perimeter 3 and a piston rod 4 by means of which a brake or any other suitable device may be operated. Extending into the cylinder 1 is an oil inlet 5 which is normally closed by means of a threaded plug 6. These parts may be of any suitable form and construction.

Bolted or otherwise suitably secured as at 7, to the cylinder 1, is a cylinder head 8 which has formed integrally therewith, or otherwise suitably secured thereto, as best shown in Fig. 4, a casing 9 which, at one end, as indicated in Fig. 1, is formed with a steam or other fluid inlet 10 into which is threaded a fluid supply pipe 11. The casing 9 is formed internally with a valve chamber 12 in which is mounted for longitudinal sliding movement a cylindrical valve 14 having a bore 15 extending therein from one end, the forward end of said bore 15 being closed as indicated at 16. The closed end 16 of the valve 14 is adapted to coöperate with a valve seat 17 formed at the inner end of the fluid inlet 10. The valve 14 is held normally against the seat 17 by means of a coil spring 18 which surrounds a core 19 formed integral with a plug 20 which is threaded into the rear end of the casing 9 as indicated at 21 and is provided at its outer end with a nut shaped enlargement 22 by means of which it will be screwed home. The plug 20 is provided with a shoulder 23 adjacent the end of the core 19, the function of said shoulder 23 being to receive the thrust of the spring 18 so as to cause said spring to hold the valve 14 normally in closed position.

The passage 10 will be referred to herein as the primary inlet to the valve chamber 12. Said valve chamber is provided with a primary outlet 25 which, as indicated in Fig. 2, preferably consists of a plurality of parallel passages, leading into the piston cylinder 1. In the embodiment of invention shown, four or more passages 25 are employed.

The reference numeral 26 indicates the secondary inlet to the valve chamber 12. In the embodiment of invention illustrated, the secondary inlet 26 consists of two passages as shown in Fig. 2, whereby its area is approximately one-half the area of the primary outlet 25.

The valve 14 is arranged so as simultaneously to open the primary outlet 25 and close the secondary inlet 26. This movement of the valve 14 occurs when fluid pressure is admitted at the primary inlet 10 so as to overcome the resistance of the spring 18 and thus open the valve 14 so as to permit the fluid pressure to pass through the primary inlet 10 and outward through the primary outlet 25 into the pressure cylinder 1 so as to throw the piston 2 in a downward direction it being understood that when the valve 14 opens the primary outlet 25 it simultaneously closes the secondary inlet 26. When the pressure is cut off at the inlet 10, the spring 18 moves the valve 14 to the right, thus closing the inlet 10 and outlet 25 and opening the secondary inlet 26. The restricted inlet 26 serves to prevent violent seating of the piston 4 against the valve seat or rim 27. The exhaust pressure after entering the valve chamber 12 through the secondary inlet 26 passes around the shoulder 23 and through a plurality of radially extending passages 28, shown best in Fig. 4. The passages 28 communicate with a valve seat 29 formed in the plug 20 and coöperating with a valve 30. The valve 30 is mounted for sliding movement in a secondary valve chamber 31 and, as shown in Fig. 5, is provided with outwardly projecting longitudinal guide fins or blades 32, which serve to guide it in its sliding movement and admit the passage of pressure therearound. The valve 30 is held normally against its seat 29 by means of the spring 33 which surrounds a core 34 formed integral with a plug 35 which is threaded into a suitable bore in the plug 20 and has an enlarged head as shown to receive a wrench. Extending longitudinally through the plug 35 is a plurality of secondary outlet passages 36, shown best in Fig. 3. The passages 36 lead into a threaded portion 37 which is adapted to receive any suitable conducting pipe.

The reference numerals 40 indicate set screws which are adapted to be screwed down against the piston tube for the purpose of applying or holding the valves, in case the fluid pressure fails for any reason.

The operation of the device is believed to be obvious from the foregoing description in connection with the drawings. When pressure is admitted through the supply pipe 11 against the end of the valve 14, said valve is moved to the left so as to close the secondary inlet 26 to the valve chamber 12 and open a passage through said valve chamber from the primary inlet 10 to the primary outlet 25. This pressure thus acts against the piston 2 and causes the same to operate. When pressure in the supply pipe 11 is cut down, the spring 18 causes the valve 14 to close and the secondary inlet 26 to open so that the pressure in the cylinder 1 exhausts slowly through the restricted inlet 26 into the valve chamber 12. The restricted passages 26 serve to prevent violent movement of the piston 2. The valve 30 with its spring 33 offers additional resistance to the escape of the exhaust pressure and this resistance can be varied by tightening or loosening the plug 35 in the plug 22. The exhaust pressure must of course overcome the resistance of the spring 33 and then pass around the space between the fins 32 and outward through the secondary outlet 36 from the secondary valve chamber 31.

The attachment of the present invention is strong, simple, durable and comparatively inexpensive in construction as well as thoroughly practical and efficient in operation.

What is claimed as new is:—

1. A relief valve having a group of inlet passages, and a group of outlet passages, there being a larger number of passages in one group than in the other group.

2. The combination with a fluid operated device, of a valve chamber having a plurality of inlets and a plurality of outlets, one outlet and one inlet of the valve chamber communicating with the fluid operated device, and a valve in said chamber arranged to close one inlet and open one outlet, one inlet and one outlet of the valve chamber being on one side of the valve and the other inlet and outlet of the valve chamber being on the other side of the valve.

3. The combination with a fluid operated device, of a casing having a valve chamber, primary and secondary inlets for the valve chamber, primary and secondary outlets for the valve chamber, and means for simultaneously opening one of the inlets and one outlet, and closing the other inlet.

4. The combination with a fluid operated device, of an attachment having primary and secondary valve chambers, the primary valve chamber exhausting into the secondary valve chamber, a valve in each of said chambers, a pair of inlets to the primary valve chamber, a pair of outlets therefrom, one of said outlets communicating with the secondary valve chamber.

5. An attachment for fluid operated devices comprising a cylinder, a cylinder head secured to the cylinder and having thereon a casing, a valve chamber in said casing, a valve movably mounted in said chamber, a primary inlet for the chamber, and a primary outlet for the chamber communicating with the cylinder, a secondary inlet leading from the cylinder to the valve chamber, a secondary outlet, a secondary valve chamber, a spring operated valve in the secondary valve chamber, the valve in the first mentioned valve chamber being adapted to open the primary outlet and simultaneously close the secondary inlet, said secondary inlet being smaller in area than said primary outlet.

6. The combination with a fluid operated device, of a valve chamber having a primary inlet and a primary outlet, at one end thereof, and a secondary inlet and a secondary outlet at the other end thereof, a secondary valve chamber in communication with said secondary outlet, a valve in said secondary valve chamber, and a valve in said first mentioned valve chamber, the primary inlet and primary outlet being arranged on one side of said valve and the secondary inlet and secondary outlet being arranged on the other side of said valve, the primary outlet and the secondary inlet being in communication with said fluid operated device.

In testimony that I claim the foregoing as my own, I have hereto affixed my signature in the presence of two witnesses.

ERNESTE ROTHLISBERGER.

Witnesses:
H. P. GRIMES,
STANLEY SCOTT.

---

Copies of this patent may be obtained for five cents each, by addressing the "Commissioner of Patents, Washington, D. C."